United States Patent
Smely et al.

(10) Patent No.: US 9,019,151 B2
(45) Date of Patent: *Apr. 28, 2015

(54) METHOD AND DEVICE FOR DETERMINING THE DISTANCE BETWEEN A RADIO BEACON AND AN ONBOARD UNIT

(75) Inventors: Dieter Smely, Schwechat (AT); Josef Winkler, Baden (AT); Oliver Nagy, Vienna (AT); Alexander Paier, Vienna (AT); Robert Povolny, Vienna (AT)

(73) Assignee: Kapsch TrafficCom AG, Vienna (AT)

(*) Notice: Subject to any disclaimer, the term of this patent is extended or adjusted under 35 U.S.C. 154(b) by 222 days.

This patent is subject to a terminal disclaimer.

(21) Appl. No.: 13/701,490
(22) PCT Filed: Nov. 29, 2011
(86) PCT No.: PCT/AT2011/000479
§ 371 (c)(1),
(2), (4) Date: Nov. 30, 2012
(87) PCT Pub. No.: WO2012/075514
PCT Pub. Date: Jun. 14, 2012

(65) Prior Publication Data
US 2013/0084890 A1 Apr. 4, 2013

(30) Foreign Application Priority Data
Dec. 7, 2010 (EP) .................................. 10450189

(51) Int. Cl.
| | | |
|---|---|---|
| *G01S 11/10* | (2006.01) | |
| *G07B 15/06* | (2011.01) | |
| *G08G 1/015* | (2006.01) | |
| *G01S 11/02* | (2010.01) | |
| *H04W 4/02* | (2009.01) | |
| *G08G 1/01* | (2006.01) | |

(52) U.S. Cl.
CPC .............. *G01S 11/10* (2013.01); *G01S 11/026* (2013.01); *G08G 1/01* (2013.01); *G07B 15/063* (2013.01); *G08G 1/015* (2013.01); *H04W 4/023* (2013.01)

(58) Field of Classification Search
CPC ..... G01S 11/10; G01S 11/026; G07B 15/063; G08G 1/015; G08G 1/01; H04W 4/023
USPC ......................................................... 342/118
See application file for complete search history.

(56) References Cited

U.S. PATENT DOCUMENTS

| | | | |
|---|---|---|---|
| 3,006,074 A | 10/1961 | Heller | |
| 3,195,136 A | 7/1965 | Klein | |

(Continued)

FOREIGN PATENT DOCUMENTS

| | | |
|---|---|---|
| CN | 1555495 A | 12/2004 |
| CN | 102933979 A | 2/2013 |
| GB | 2 376 585 B | 3/2005 |

OTHER PUBLICATIONS

International Search Report of corresponding PCT/AT2011/000479, dated Feb. 23, 2012, 5 pages.

(Continued)

*Primary Examiner* — Matthew M Barker
(74) *Attorney, Agent, or Firm* — Fiala & Weaver P.L.L.C.

(57) ABSTRACT

System and method for determining the distance between a radio beacon and a vehicle device passing in the radio beacon, in a road toll system. A signal having a known temporal profile is emitted by one of the radio beacon and vehicle device. The signal is captured in the other component during the passing of the device and the temporal profile of the frequency is recorded in relation to the known temporal profile; a modification in the recoded frequency profile exceeding a first threshold value is detected; two distant wave zones in the frequency profile, lying temporally in front of and behind the detected modification are determined, the zones displaying a frequency modification below a second threshold value are searched for; the recorded frequency profile is scaled in such a way that the distant wave zones take the predetermined values; and the distance is determined from the scaled frequency profile.

45 Claims, 8 Drawing Sheets

(56) References Cited

U.S. PATENT DOCUMENTS

| | | |
|---|---|---|
| 5,790,052 A | 8/1998 | Grabow |
| 5,863,120 A | 1/1999 | Gallagher et al. |
| 7,593,711 B2 | 9/2009 | Romano et al. |
| 8,566,148 B2 | 10/2013 | Karner |
| 2009/0102718 A1 | 4/2009 | Karlsson |
| 2009/0303004 A1 | 12/2009 | Tuttle |

OTHER PUBLICATIONS

International Written Opinion of corresponding PCT/AT2011/000479, 6 pages.
EP Search Report of corresponding EP 10450189.5, dated Mar. 16, 2011, 4 pages.
International Search Report of PCT/AT2011/000480, dated Feb. 9, 2012, 6 pages.
NZ Office Action of NZ 595895, dated Oct. 27, 2011, 2 pages.
Search report issued on Jan. 25, 2013 in corresponding Singapore Application No. 201109026-3, 18pp.
International Written Opinion of corresponding PCT/AT2011/000480, recieved Oct. 7, 2012, 6 pp.
Office Action received for Chinese Patent Application No. 201180026112.9, mailed on Aug. 14, 2014, 4 pages of official copy.
Office Action received for Chilean Patent Application No. 2011-003093, mailed on Oct. 30, 2013, 7 pages of Official copy.
Office Action received for Chilean Patent Application No. 2011-003093, mailed on Jul. 27, 2014, 8 pages of Official copy.
Chilean Application No. 0244-1998, filed 1998, 47 pages.
Chilean Application No. 1178-2006, filed May 18, 2006, 79 pages.
Chilean Application No. 622-2004, filed Mar. 24, 2004, 24 pages.

METHOD AND DEVICE FOR DETERMINING THE DISTANCE BETWEEN A RADIO BEACON AND AN ONBOARD UNIT

CROSS-REFERENCE TO RELATED APPLICATION(S)

This application is a National Phase Patent Application and claims priority to and benefit of international Application Number PCT/AT2011/000479, filed on Nov. 29, 2011, which claims priority to and the benefit of European Patent Application No. 10450189.5, filed on Dec. 7, 2010, the entire disclosures of which are incorporated herein by reference.

FIELD OF THE INVENTION

The present invention relates to a method for determining the distance between a radio beacon and an onboard unit passing it in a road toll system, wherein at least one of the two components, the radio beacon and the onboard unit, emits a signal with a known curve of its frequency over time. The invention additionally relates to a radio beacon and an onboard unit for implementing such a method.

BACKGROUND

In radio beacon-based road toll systems, e.g. according to the dedicated short-range communication (DSRC) or wireless access in a vehicle environment (WAVE) standard, onboard units (OBUs) carried by the vehicles communicate with geographically distributed radio beacons via short-range radio transmission as soon as they pass these. The radio communication generally serves to locate the vehicle on the radio coverage area of the radio beacon to charge for usage of locations or also simply to transmit toll data generated by the OBU to radio beacons on its route.

It is often desirable to determine the distance at which a vehicle passes a radio beacon, e.g. to penalise toll violations in the case of multi-lane roads. When multiple vehicles travelling next to one another in different lanes pass the radio beacon and one of its radio communications indicates a toll violation, e.g. a missed toll charge debit, an inadequate balance of a charge account, a defective or incorrectly adjusted OBU etc., or a lane-dependent charge rate or toll (multiple occupant lane) is to be calculated, then it is essential to know which of the vehicles travelling next to one another is responsible for the toll violation. The toll violation may be identified, e.g. visually in situ or by an evidence photo of the road section of the beacon.

Various methods of determining the distance are currently known. One solution is to use multiple physically offset receiving antennae in the radio beacon to determine the positions of the OBUs in the radio receiving field from phase difference measurements between the OBU signals received by the individual antennae. Another solution is known from the U.S. Pat. No. 5,790,052 and is based on Doppler measurements of the different relative speeds of an OBU in relation to physically offset receiving antennae of a radio beacon to determine the ratio of the distances from the two receiving antennae from the ratio of the speed measured values. Also, it would is possible to use a separate radio beacon with a low radio coverage range for each lane. All these known solutions are expensive, because they are based on multiple receiving antennae.

SUMMARY

In some embodiments, the invention provides methods and devices for determining the distance between an OBU and a radio beacon in a road toll system, which requires lower equipment expenditure for conversion than the known solutions.

In some embodiments, the present invention is method for determining a distance between a radio beacon and an onboard unit passing the radio beacon in a road toll system, wherein at least one of the radio beacon and the onboard unit emits a signal with a known frequency curve over time. The method includes: receiving the signal by the other of the radio beacon and the onboard unit during the passing and recording the curve of its frequency over time in relation to the known frequency curve over time, wherein the recording of the frequency curve is started when the strength of the received signal exceeds a minimum threshold and is ended when the strength of the received signal falls below the minimum threshold; detecting a change in the recorded frequency curve exceeding a first threshold value; determining two far regions in the frequency curve lying before and after the detected change in time that show a frequency change below a second threshold value; scaling the recorded frequency curve in such a manner that the far regions assume predetermined values; and determining said distance from the scaled frequency curve In some embodiments, the invention is a radio beacon for a road toll system for determining a distance of a vehicle passing the radio beacon, wherein the vehicle is equipped with an onboard unit which emits a signal with a known frequency curve over time. The radio beacon includes: a receiver configured to receive the signal of said passing vehicle; a sensor for detecting an approach of said vehicle towards the radio beacon; a memory electrically coupled to the receiver and the sensor and configured to record the known frequency curve of the received signal over, when said sensor detects the approach of the vehicle; a detector electrically coupled to the memory and configured to detect a change in the recorded frequency curve exceeding a first threshold value; a first evaluation device electrically coupled to the detector and the memory and configured to determine two far regions in the frequency curve tying before and after the detected change that show a frequency change below a second threshold value; a scaling device electrically coupled to the memory and the first evaluation device and configured to scale the recorded frequency curve in such a manner that the far regions assume predetermined values; and a second evaluation device electrically coupled to the scaling device and configured to determine the distance from the scaled frequency curve.

The radio beacon can be arranged to be fixed on a road or be mobile, e.g. mounted on a control vehicle of the road toll system.

In some embodiments, the invention is an onboard unit (OBU) for a road toll system for determining a distance from a radio beacon of the road toll system, wherein the radio beacon emits a signal with a known frequency curve over time. The onboard unit includes: a receiver configured to receive the signal from the radio beacon; a sensor for detecting an approach of the onboard unit towards said radio beacon; a memory electrically coupled to the receiver and the sensor and configured to record the frequency curve of the received signal over time, when said sensor detects said approach; a detector electrically coupled to the memory and configured to detect a change in the recorded frequency curve exceeding a first threshold value; a first evaluation device electrically coupled to the detector and the memory and configured to determine two far regions in the frequency curve lying before and after the detected change in time that show a frequency change below a second threshold value; a scaling device electrically coupled to the memory and the first evaluation device and configured to scale the recorded frequency curve in such a manner that the far regions assume predetermined values; and a second evaluation device electrically coupled to the scaling device and configured to determine the distance from the scaled frequency curve.

With respect to further features and advantages of the radio beacon, assembly and onboard unit according to the invention, reference is made to the above statements regarding the method.

BRIEF DESCRIPTION OF THE DRAWINGS

The invention shall be explained in more detail below on the basis of preferred exemplary embodiments with reference to the accompanying drawings.

DETAILED DESCRIPTION

The present invention makes use of the circumstance that at the time of direct passage the Doppler-related frequency change of the radio beacon or OBU signal is inversely proportional to the normal distance between the radio beacon and the OBU when the distance is minimal, so long as the frequency curve is normalised to the relative speed between the beacon and the vehicle. The latter is achieved by evaluating the frequency curve in "far regions". In these far regions, the distance of the components from one another compared to the normal distance is very large and this is negligible, and therefore the extent of the Doppler shift there depends substantially only on the inherent speed, which can be determined therefrom. Further, the dependence on the normal distance, can be determined from the analysis of the frequency curve compensated by the inherent speed in the near region of the beacon where the greatest change ("Doppler jump") of the frequency curve occurs. As a result, the passing distance can be determined from the radio communication between the OBU and the radio beacon with a single receiver and a single antenna.

The scaled frequency curve can be evaluated in the near range by signal analysis in a wide variety of ways. According to some embodiments of the invention the distance is determined from the gradient of the scaled frequency curve in an inflection point thereof. The gradient in the inflection point is inversely proportional to the passing distance and can be simply determined, for example, by differentiation.

According to some embodiments of the invention, the distance is determined from a frequency value of the scaled frequency curve lying between an inflection point of the scaled frequency curve and a far region. At such a point, which lies both at a distance from the inflection point and at a distance from the far regions, the frequency value of the scaled frequency curve is a significant dimension for the distance. That is, the higher the frequency value, the shorter the passing distance, and vice versa. This criterion renders a differentiation of the frequency curve unnecessary. However, since the proportionality is non-linear, a conversion table is generally of advantage for determining the passing distance.

In some embodiments, the distance is determined from an integral of the scaled frequency curve over a section lying between an inflection point thereof and a far region. The integral of the scaled frequency curve is also a significant criterion for the passing distance. Thus, the frequency values of the scaled frequency curve can be integrated, e.g. between the inflection point and one of the far regions, and the integral ("area under the curve") is an—albeit non-linear—dimension for the passing distance. That is, the higher the integral, the shorter the passing distance, and vice versa. A table may be used for conversion of the non-linear proportionality between the integral and the passing distance.

In some embodiments, the frequency curve of the received signal is only recorded in the area of interest around the Doppler jump to save storage capacity, compute power and transmission channel resources. In some embodiments, the recording of the frequency curve is started when the strength of the received signal exceeds a minimum threshold and is ended when the strength of the received signal falls below the minimum threshold. As will be explained in more detail below, if the signal is an intermittent signal composed of individual data packets, the recording is ended only when no further signal is received over a given minimum time period, which corresponds to the possible signal gap between two data packets of the signal, no further signal is received.

In some embodiments, especially for the case where the signal is emitted by the radio beacon and received by the onboard unit, the recording of the frequency curve is started when an approach of the onboard unit to the radio beacon is detected, for example, by a sensor of the onboard unit.

In this case, if the sensor comprises a satellite navigation receiver for determining the position of the onboard unit and a list of prestored locations of radio beacons, and an approach (by an OBU) to a radio beacon is detected when the specific position comes into the vicinity of a stored location, high accuracy and reliability of the triggering of the recording of the frequency curve can be achieved.

In some embodiments, especially for the case where the signal is emitted by the onboard unit and received by the radio beacon, the recording of the frequency curve is started when an approach of an onboard unit to the radio beacon is detected by means of a sensor of the radio beacon.

In this case, a transceiver with a range that is greater than the receiving range of the radio beacon for the said signal may be used as sensor for radio interrogation of onboard units. For example, the transceiver used as sensor can be a DSRC transceiver with a directional antenna, which is directed onto the course of the road and has a radio coverage area e.g. of ±10 to 20 m around the beacon. The transceiver for Doppler jump evaluation may be a WAVE transceiver of the radio beacon with omnidirectional characteristic, the radio coverage area of which has a radius of e.g., 5 to 10 m. It is also be possible to use a WAVE transceiver with a larger range, as the sensor and a DSRC transceiver with a smaller range for the Doppler evaluation.

The signal emitted by the radio beacon does not necessarily have to be emitted continuously. Rather, it can be emitted intermittently and the frequency curve can be processed in a time-discrete manner for time points, at which the signal is received. As a result, time-discrete scan values of the frequency curve can be determined. That is, if there are sufficient scan values at sufficiently short time intervals, the distance can be determined therefrom with sufficient accuracy.

The road lane of a multi-lane road, in which the vehicle is moving, can then be determined from the distance. As a result, toll violations can be matched unequivocally to a road lane and the vehicle(s) located therein in the case of parallel passing vehicles.

The Doppler shift evaluated with the method of the invention can be measured at any desired frequency of the signal, whether it is a carrier frequency or a modulation frequency thereof. Modulation frequency is understood to be a frequency of any desired modulation of the OBU signal, whether it is a simple frequency, amplitude modulation, one of the modulation frequencies of an OFDM modulation, or a pulse or burst modulation that occurs as a result of periodic transfers of entire data blocks. Such a block repetition rate can also be regarded as a modulation frequency, the Doppler frequency shift of which can be measured.

The method of the invention is suitable for all types of radio beacon-based road toll systems. The method is particularly suitable for DSRC and WAVE road toll systems, in which a DSRC or WAVE transmitter of the onboard unit or the radio beacon is used to emit the signal. Other configurations using RFID technology, or also any cellular (e.g. GSM, UMTS, LTE) and near-range radio technologies (e.g., Bluetooth, WLAN), are also possible.

Figure 1:
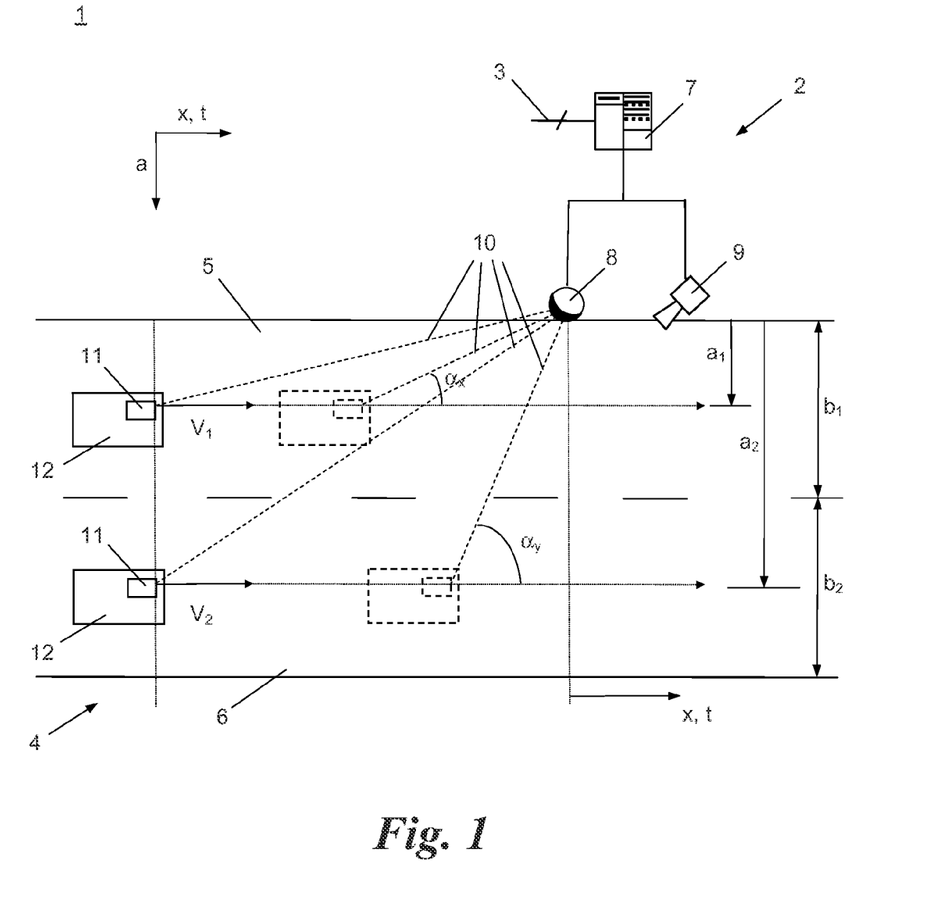
FIG. 1 is a schematic plan view of a radio beacon on a multi-lane road showing the geometric relationships during the passage of two vehicles.

FIG. 1 shows a road toll system 1 comprising a plurality of geographically distributed radio beacons 2 (only one shown for representation), which connect with a central control unit (not shown) of the road toll system 1 via data connections 3. The radio beacons 2 are respectively installed on a road 4 that may comprise multiple carriageways or lanes 5, 6.

For example, the radio beacon 2 includes a local computer 7, a (transmitter/) receiver 8 and a camera 9, which—operated by the computer 7—can record images of the road 4 with its lanes 5, 6 for penalising toll violations.

The (transmitter/) receiver 8 serves to conduct radio communications 10 with onboard units or OBUs 11 that are carried by vehicles 12 passing the radio beacon 2 in the road lanes 5, 6. The radio communications 10 are generally bidirectional data package connections. An analysis of the signals sent by the OBUs 11 to the (transmitter/) receiver 8 of the radio beacon 2 is sufficient in a first embodiment of the invention, and therefore only the OBU 11 sending signals 10 to the receiver 8 of the radio beacon 2 will be described in the following. Signals 10 in the opposite direction can also be analysed in embodiments explained below.

It is understood that the radio beacon 2 does not necessarily have to be fixed, but can also itself be carried by a vehicle, e.g. by a control vehicle, which in moving traffic passes vehicles 12 with OBUs 11 or is passed by these.

The vehicles 12 with the OBUs 11 move in lanes 5, 6 at different speeds $v_1$, $v_2$ past the radio beacon 2, more precisely the beacon's receiver 8, at different passing or normal distances $a_1$, $a_2$. In this case, the signals 10 emitted by the OBUs 11 are respectively subject to frequency-dependent Doppler shifts in accordance with the known formula $$f_D = \frac{f_s}{1 - \frac{v}{c}} \quad (1)$$

where
$f_s$—transmission frequency of the signal 10 of the OBU 11
$f_D$—Doppler-shifted receiving frequency of the signal 10 in the radio beacon 2 if the OBU 11 were to move towards it front on;
v—speed of the OBU 11; and
c—speed of light.

If the OBU 11 moves past the radio beacon 2 at a distance a, equation (1) can be written by means of geometric deliberations as $$f_B \equiv \cos\left[\arctan\left(\frac{a}{x}\right)\right] f_D \quad (2)$$

where
a—vertical distance of the OBU 11 from the radio beacon 2 in the coordinate system of FIG. 1;
x—horizontal distance of the OBU 11 from the radio beacon 2 in the coordinate system of FIG. 1; assuming a constant speed v or $v_1$, $v_2$ of the OBUs 11 the horizontal distance also simultaneously corresponds to time t; and
$f_B$—Doppler-shifted receiving frequency of the signal 10 in the radio beacon 2 when the OBU 11 is moving past it at the distance a.

Figure 2:
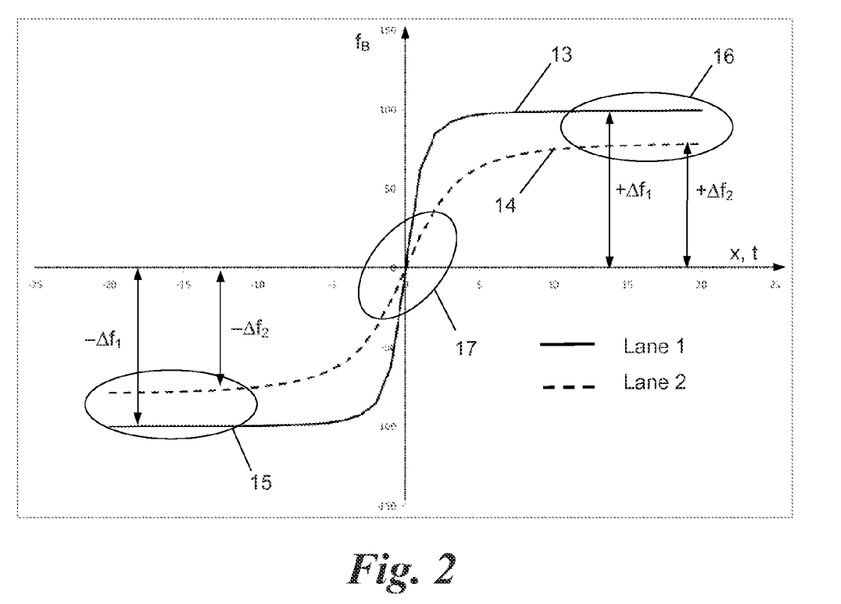
FIG. 2 shows frequency curves of the signals of two vehicles when passing the radio beacon.

FIG. 2 shows two exemplary curves of the receiving frequency $f_B$ in relation to the horizontal distance "x" or the time "t". The solid line 13 shows the receiving frequency curve for the OBU 11 in lane 5 and the broken line 14 shows that for the OBU 11 in lane 6. As can be seen, the Doppler-related frequency shift $\pm \Delta f_1$, $\pm \Delta f_2$ in "far regions" 15, 16 of the frequency curves 13, 14 far before and after a region 17 of maximum change $f_B'=\partial f_B/\partial t$ is small, i.e. the frequency change $f_B'$ lies below a significance threshold $\epsilon$ in the far regions 15, 16.

Therefore, in the far regions 15, 16 (and naturally also further outside these) the extent of the Doppler shift $\pm \Delta f$ is scarcely dependent on the passing distance "a" any longer and instead is almost exclusively dependent on the speed "v". The effect of the vehicle speed "v" on the frequency curves 13, 14 can therefore be eliminated by scaling these so that they respectively assume the same value in the far regions 15, 16, e.g. a predetermined value $\pm \Delta F$.

Figure 3:
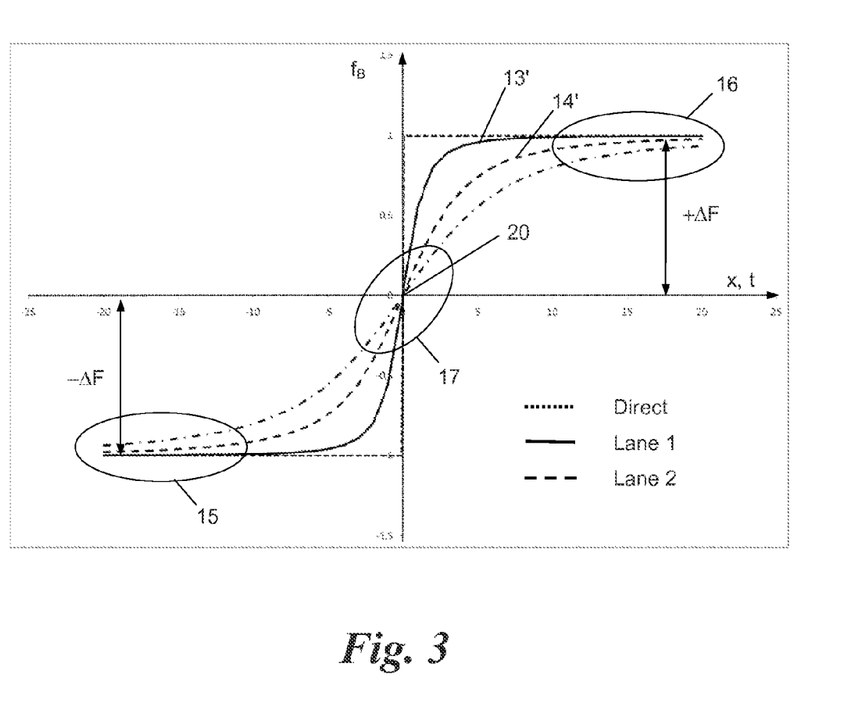
FIG. 3 shows the frequency curves of FIG. 2 after being scaled.

FIG. 3 shows the result of such scaling, in which the recorded frequency curves 13, 14 have been scaled ("normalised") so that they assume the predetermined values $\pm \Delta F$ in the far regions 15, 16.

The scaled frequency curves 13', 14' therefore are more dependent on the ratio a/x, i.e. the passing distance a to the horizontal distance x or to the time t, in accordance with the following $$f_B \equiv \cos\left[\arctan\left(\frac{a}{x}\right)\right] f_s \quad (3)$$

As can be seen from FIG. 3, the scaled frequency curves 13', 14' differ particularly clearly in their gradient $f_B'=\partial f_B/\partial t$ at the location x=t=0, at which their curve at the same time shows an inflection point 20. The greater the passing distance "a", the "more abraded" the scaled frequency curve 13', 14', i.e. the lower the gradient $f_B'$ at the inflection point 20. Therefore, the passing distance a is inversely proportional to the gradient $f_B'$, i.e.

$$\frac{1}{a} \equiv \lim_{x \to 0} f_B'(x) \quad (4)$$

Figure 4:
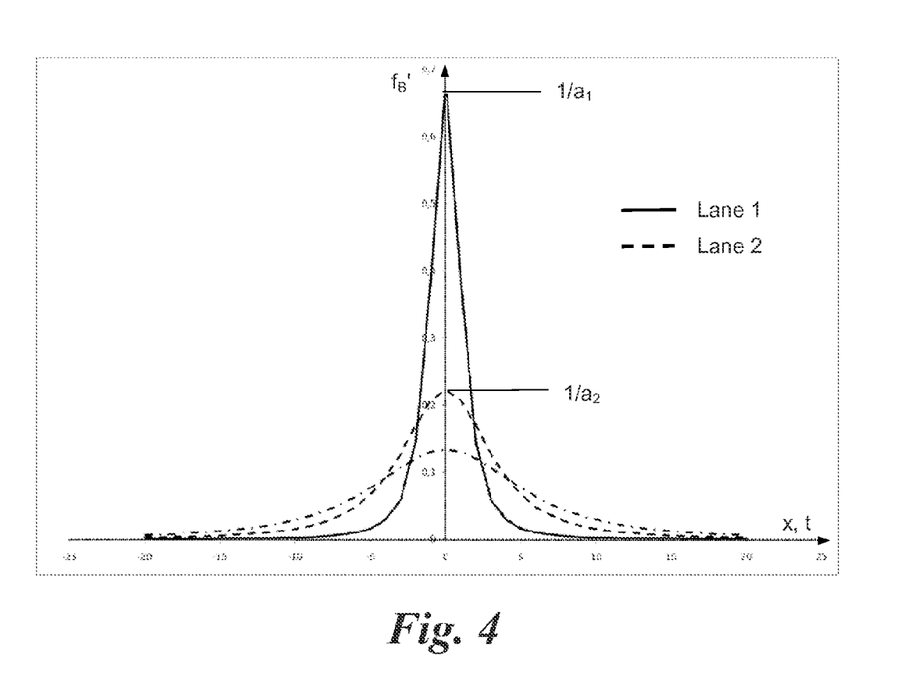
FIG. 4 shows the differentials of the scaled frequency curves of FIG. 3.

The gradient $f_B'$ at the inflection point 20 can be determined by differentiating the scaled frequency curves 13', 14', and the result of the differentiation is shown in FIG. 4.

With knowledge of the lane width $b_1$, $b_2$ of lanes 5, 6. The respective lane 5, 6 in which the OBU 11 was located during the transmission of its signal 10 can then be determined from the passing distances $a_1$, $a_2$ determined in this manner. A simple relative comparison of the passing distances $a_1$, $a_2$ is often also sufficient to determine the local sequence of the vehicles.

It has been assumed hitherto that the transmitting frequency $f_s$ of the signal 10 of the OBU 11 is constant, i.e. its own curve over time is a constant curve. However, it is also possible that the OBU 11 transmits a signal 10 with a transmitting frequency curve that is non-constant in time, e.g. in the case of frequency hopping radio communications, in which the transmitting frequency is constantly changes—according to a predetermined or known pattern. The receiving frequency curves 13, 14 are recorded relative to the prior known curve of the transmitting frequency $f_s$ of the OBU 11 over time, whether it is constant or changing. That is, the receiving frequency curve is referenced or normalised to the transmitting frequency of the OBU, so that the effect of known changes in transmitting frequency of the OBU 11 can be compensated.

Therefore, the method for determining the passing distance a of the OBUs 11 passing the radio beacon 2 is configured as follows:

The frequency curve 13, 14 of the signal 10 of the OBU 11 is plotted in relation to time t(=x)—possibly based relatively on a prior known curve of the transmitting frequency $f_s$ over time. Then, the region 17 is approximately determined in the frequency curve 13, 14 at which a significant change indeed occurs, i.e. $\partial f_B/\partial t$ exceeds a predetermined detection threshold σ ("first threshold"). This serves to obtain a time reference point for seeking the two far regions 15, 16 which must lie before and after the change 17 and be so far removed from this that no further significant frequency change $\partial f_B/\partial t$ occurs in these, i.e. this lies below a predetermined significance threshold ε ("second threshold").

With knowledge of the far regions 17, 18 and the Doppler shifts ±Δ$f_1$, ±Δ$f_2$ occurring therein (which can also be considered to be quasi-constant because their change does not exceed the significance threshold ε), the frequency curves 13, 14 can now be scaled so that they respectively assume the same predetermined value ±ΔF in their far regions 15, 16.

The inflection point 20 is then determined in the scaled frequency curves 13', 14'. For this, the location "x" or the time "t" is determined in the frequency curves at which the receiving frequency $f_B$ assumes either the frequency mean value (the "middle") between the "quasi-constant" far regions 15, 16 or—if the rated frequency of the signal 10 of the resting OBU 11 is known assumes this rated frequency. The inflection point 20 can be determined in both ways, i.e. both before and after the scaling in the frequency curves 13, 14, and after the scaling in the scaled frequency curves 13', 14'.

After determining the inflection point 20, the gradient $f_B'$ (x=t=0) of the scaled frequency curves 13', 14' in the inflection point 20 can be determined (see FIG. 4) and the passing distance "a" or $a_1$, $a_2$ can be determined therefrom, as explained above.

Figure 5:
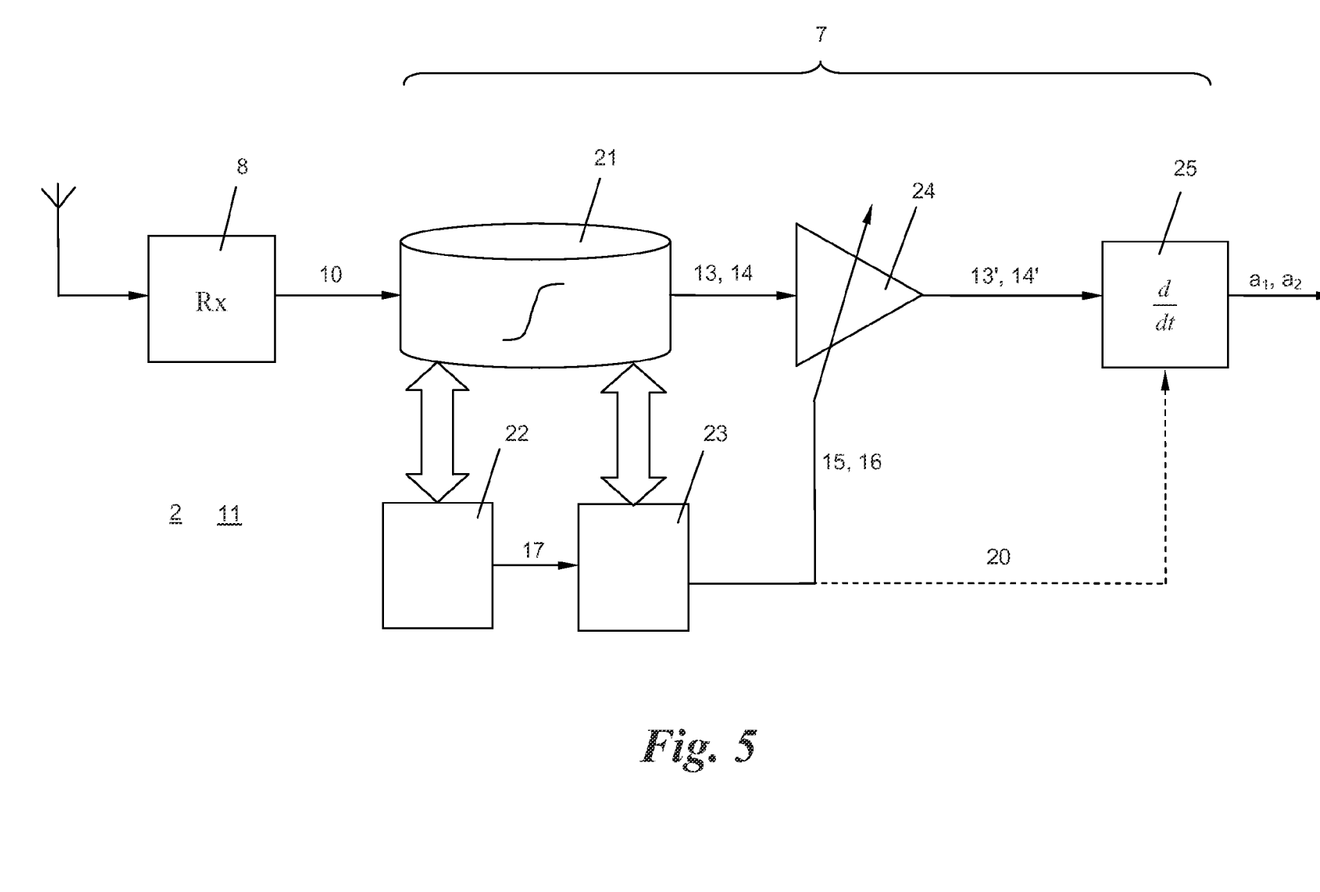
FIG. 5 is a block diagram of the radio beacon or the onboard unit according to the invention.

FIG. 5 shows an exemplary hardware configuration of the radio beacon 2 for conducting the outlined method. Connecting to the receiver 8 the radio beacon 2 has a memory 21, in which the time frequency curves 13, 14 of the received signals 10 are recorded. A detector 22 connected to the memory 21 detects the change region 17 ($\partial f_B/\partial t > \sigma$) and feeds this information 17 to an evaluation device 23. The evaluation device 23 determines the far regions 15, 16 of the frequency curves 13, 14 with $\partial f_B/\partial t < \epsilon$ therefrom and with this information 15, 16 actuates a scaling device 24 that scales the frequency curves 13, 14 to scaled frequency curves 13', 14'. The latter are fed to a differentiator 25, which calculates the gradient $f_B'(0) = \partial f_B/\partial t$ at the location x=t=0 of its inflection point 20 in order to determine the passing distances $a_1$, $a_2$ therefrom.

The components 21-25 can be implemented, for example, by the local computer 8 of the radio beacon 2.

Figure 6:
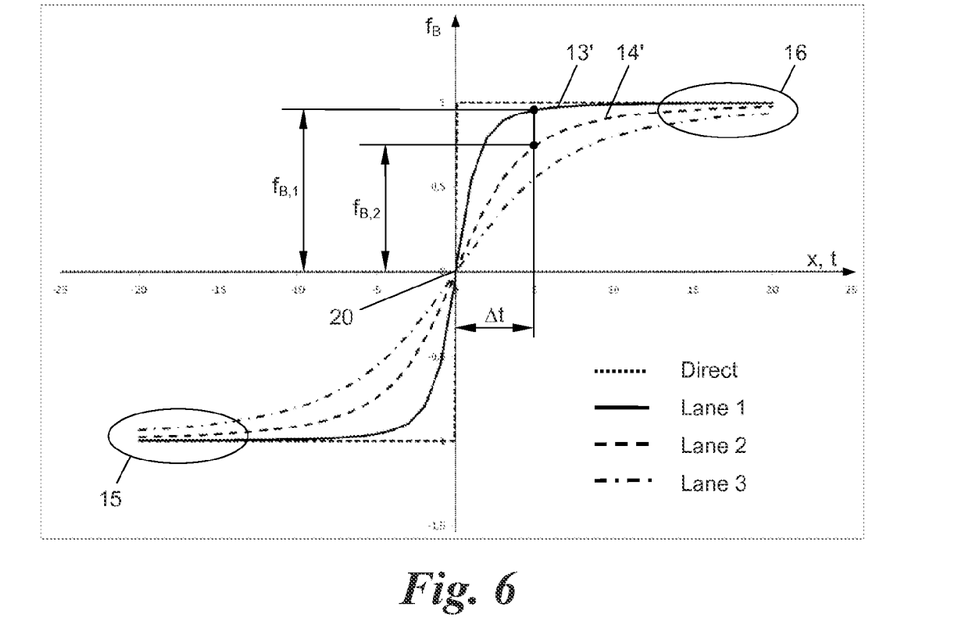
FIGS. 6 and 7 show alternative evaluation methods tier the scaled frequency curves of FIG. 3.
Figure 7:
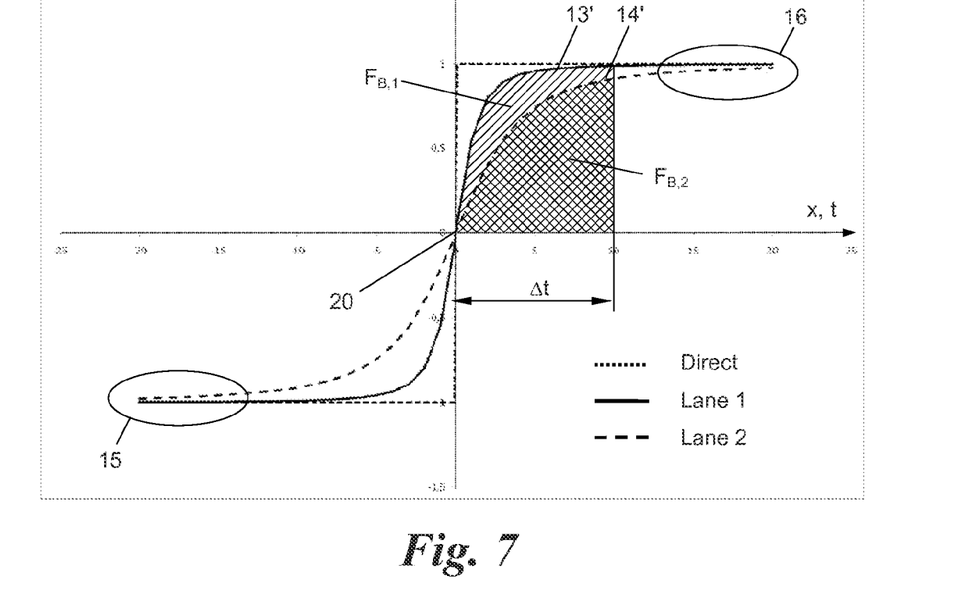

FIGS. 6 and 7 show some embodiments of the method outlined so far, which differ in the step of determining the passing distance a from the scaled frequency curve 13', 14', as explained above. While the evaluation of the gradient $f_B'$ of the scaled frequency curve 13', 14' in the inflection point 20 is a particularly significant criterion for the passing distance a, other signal-analysis parameters of the scaled frequency curve 13', 14' can also be evaluated.

FIG. 6 shows a first variant, in which the frequency values $f_{B,1}$ or $f_{B,2}$ of the scaled frequency curves 13', 14' are evaluated at a location Δx=Δt lying between the inflection point 20 (x=t=0) and one of the far regions 15, 16, i.e. $f_{B,1}$ (Δt) or $f_{B,2}$ (Δt). The location Δx=Δt can be selected, for example, half way between the inflection point 20 and one of the far regions 15 or 16.

Then the respective passing distance $a_1$, $a_2$ can be determined from the corresponding frequency value $f_{B,1}$ (Δt) or $f_{B,2}$ (Δt). The higher the frequency value $f_B$ at the predetermined location Δt, the smaller the passing distance a. The frequency value $f_B$ of the scaled frequency curve 13', 14' relating to a specific passing distance a can be determined in test series and stored in a data bank or table, for example, which is then accessed during measurement in order to determine the respective passing distance a from a frequency value $f_B$.

Figure 8A:
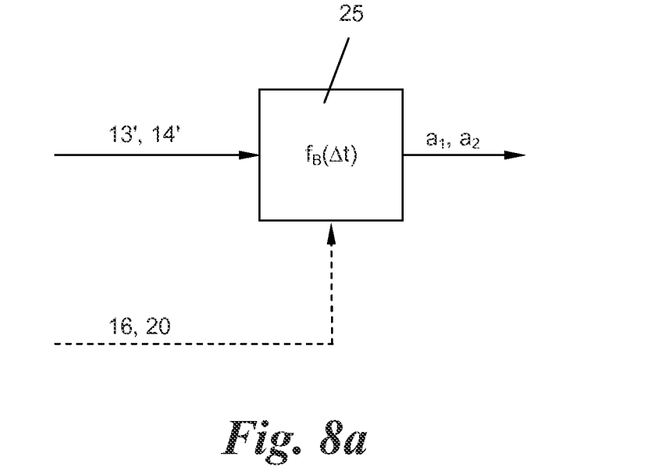
FIGS. 8a and 8b show variants of the second evaluation device of the radio beacon or the onboard unit of FIG. 5 for implementing the methods of FIGS. 6 and 7.

FIG. 8a shows a modified evaluation device 25 of the radio beacon 2 of FIG. 5. The modified evaluation device 25 is not configured as a differentiator here, but as a scanning element, which extracts the function value $f_B$ at the predetermined location Δt of the scaled frequency curve 13', 14', wherein the location Δt between the inflection point 20 and a far region, e.g. far region 16, is selected.

FIG. 7 shows a further technique for evaluating the scaled frequency curves 13', 14' by calculating integrals thereof. The integrals of the scaled frequency curves 13', 14' from the inflection point 20 to a predetermined location Δx=Δt correspond to the areas $F_{B,1}$ for the scaled frequency curve 13' or $F_{B,2}$ for the scaled frequency curve 14' represented by hatching in FIG. 7. As can be seen, the integrals $f_B(\Delta t)$ are different depending on passing distance a. The smaller the passing distance a, the greater the integral or the area $F_B$. Once again, by means of test series for different passing distances a the respectively occurring areas or integrals $F_B$ can be determined and prestored in a table or data bank so that the respectively associated passing distance a can be determined later in the measurement operation from a measured integral value $F_B$.

In this case, the integration limits of the integrals $F_B$ can be respectively selected from the inflection point 20 (x=t=0) up to a point Δx=Δt between the inflection point 20 and one of the far regions 15, 16, or also from the inflection point 20 up to a far region 15, 16. Instead of the inflection point 20 a point spaced therefrom and lying in front of one of the far regions 15, 16 can also be selected as lower integration limit.

Figure 8B:
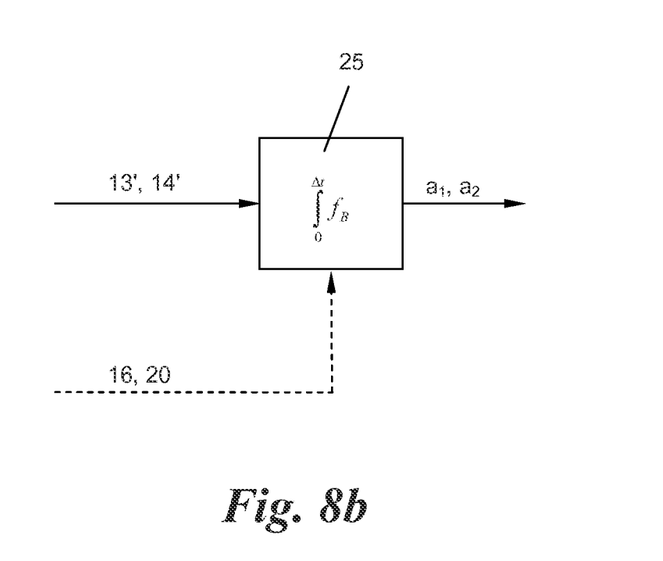

FIG. 8b shows an exemplary configuration of a second evaluation device 25 for the radio beacon 2 of FIG. 5, which is formed by an integrator. The integrator 25 conducts the integration of the scaled frequency regions 13', 14' between the said integration limits, e.g. the inflection point 20 and a far region 16, to determine the respective passing distance $a_1$, $a_2$ therefrom—e.g. on the basis of a data bank table.

In some embodiments of the invention, the entire method described so far for determining the distance a can also be performed in the OBU 11, i.e. on the basis of an evaluation of signals 10 that the OBU receives from the radio beacon 2. Accordingly, FIGS. 5 and 8 at the same time show an exemplary hardware configuration of an OBU 11 for conducting this method variant, and the components 7, 8, 21-25 are accordingly internal components of an OBU 11.

It is also possible that both the radio beacon 2 and the OBU 11 determine the distance from the respective other component 11 or 2 according to the outlined method. The receivers 8 of the beacon 2 and OBU 11 can then be configured as transceivers and the radio beacon 2 can optionally transmit to the OBU 11 the distance a it has determined and/or the OBU 11 can optionally transmit to the radio beacon 2 the distance a it has determined for cross-checking with the distance a respectively determined there.

In the same way, radio beacon 2 and OBU 11 can also exchange or impart specific information that is based on the determined distance a and relates to the respective road lane 5, 6, in which the vehicle 12 with the OBU 11 is located. The information relating to the road lane 5, 6 is useful, for example, if a road lane-dependent toll is to be charged or an unauthorised use of a road lane is to be penalised: so-called "HOT lanes" (high-occupancy toll lanes) are reserved, for example, for vehicles with a specific minimum number of occupants (so-called high-occupancy vehicles, HOVs), but can also be used by vehicles with fewer occupants on payment e.g. of an occupant number-dependent toll (HOT charge). If the OBU 11 itself determines the road lane 5, 6 as basis for calculation of a HOT charge and communicates this to the radio beacon 2, this can check the correct calculation of the HOT charge by means of its own distance measurement.

Figure 9:
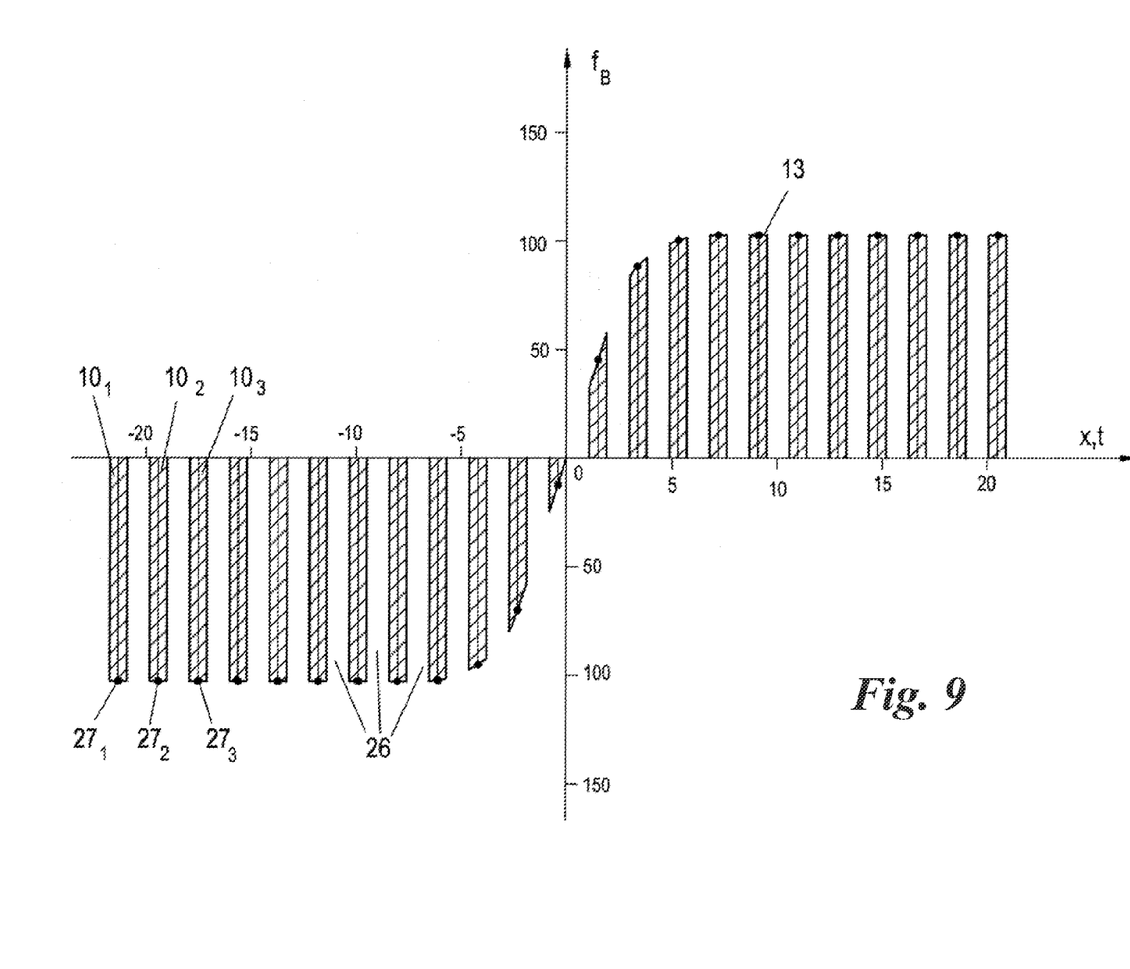
FIG. 9 shows a variant of the invention based on intermittently emitted signals and correspondingly intermittent frequency curves.

FIG. 9 shows a further variant of the outlined methods, radio beacons and OBUs, in which the signal 10 is not present continuously or constantly during the entire time span of the passage of interest here, but intermittently, i.e. interrupted by gaps 26—because of a division of the radio communication into data packets $10_1$, $10_2$, $10_3$ etc., in general $10_i$. The receiving frequency $f_B$ of the signal 10 in the respective receiving communication partner, whether radio beacon 2 or OBU 11, can thus only by recorded at discrete times, so that the frequency curves 13, 14 are quantised in a time-discrete manner (temporally scanned) into scan values $27_1$, $27_2$, $27_3$ etc., in general $27_i$.

The "uninterrupted" embodiment of FIGS. 1 to 4 (when implemented with a conventionally clocked processor system, e.g. according to FIGS. 5 and 8) also represents a time-discrete system with a scanning rate corresponding to the scanning rates of the analog/digital converters used and clock rates of the processors used. This means merely a reduction in accuracy to the extent of a scanning rate reduced to the time points $27_i$ compared to the above-mentioned embodiments. If the time points $27_i$ are set correspondingly closely, a correspondingly high scanning rate results for the frequency curves 13, 14 quantised in a time-discrete manner that only causes a slight reduction in accuracy in the determination of the distance "a".

The intermittent signals 10 of the embodiment of FIG. 9 can be formed, for example, by a sequence of data packets $10_i$, which are exchanged between the radio beacon 2 and the OBU 11 according to the DSRC or WAVE standard. According to the DSRC standard, for example, a radio beacon 2 periodically transmits so-called Beacon Service Table messages (BST) to prompt the OBUs 11 entering its radio coverage area to respond. In a similar manner, according to the WAVE standard a radio beacon 2 can repeatedly transmit so-called WAVE Service Announcement messages (WSA), which can be picked up by passing OBUs 11. Each BST or WSA message of the radio beacon 2 then forms a data packet $10_i$ of a sequence, which can be evaluated as a signal 10 by the OBU 11 in the described manner.

Conversely, a radio beacon 2 can evaluate repeated data transmissions of an OBU 11 as a signal 10. Since according to the DSRC and WAVE standard OBUs 11 generally only respond upon prompting by a radio beacon 2, the radio beacon 2 transmits a periodically repeated request signal for this that respectively prompts a response of an OBU 11, e.g. a periodic sequence of BST or WSA messages or of so-called "echo" messages, which are repeated by an OBU 11. In this way, OBUs 11 can be caused to repeatedly transmit data packets $10_i$, which can be evaluated in the radio beacon 2 in the outlined manner in order to determine the distance a.

In an exemplary embodiment with a radio beacon 2, the radio coverage area of which, viewed in the running direction of the road 4, extends approximately 20 m in front of and 20 m behind the beacon, which is approximately 40 m long. The radio beacon 2 has a time interval for the data packets $10_i$ of approximately 10 ms, which corresponds to a data packet transmission rate of approximately 100 Hz. Therefore, an OBU 11 at a travelling speed of 10 km/h is located in the radio coverage area of the radio beacon 2 for approximately 13 seconds, so that 1300 data packets $10_i$ are transmitted and thus 1300 scan values $27_i$ of the frequency curves 13, 14 can be created. Approximately 100 scan values $27_i$ can still be created at a travelling speed of approximately 130 km/h, which provides an adequate time resolution of the frequency curves 13, 14 and thus an adequate accuracy of the determination of the distance a.

If the radio beacon 2 and the OBU 11 each determine the distance "a" and the OBU 11 transmits the distance "a" it has determined to the radio beacon 2 for cross-checking, different scanning rates for the frequency curves 13, 14 can also be provided in the beacon 2, on the one hand, and the OBU 11, on the other. In particular, a reduced scanning rate can be provided on the part of the beacon 2 because this is sufficient for validation of the distance a communicated by the OBU 11.

Figure 10:
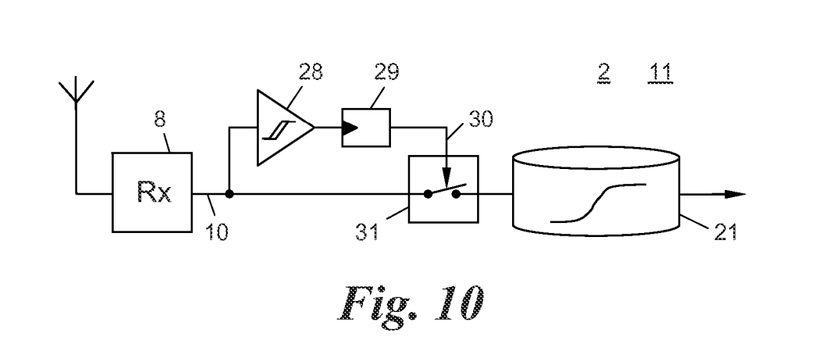
FIG. 10 shows a cutout section of the block diagram of FIG. 5 with a first variant for control of the frequency curve recording.
Figure 11:
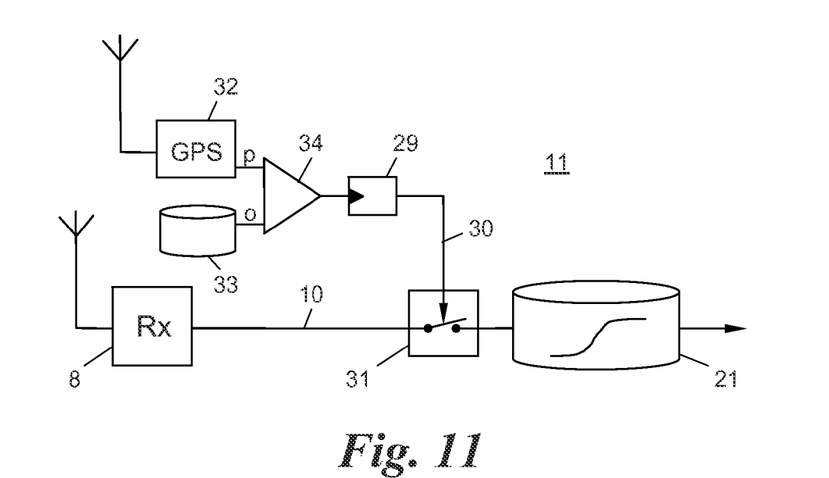
FIG. 11 shows a cutout section of the block diagram of FIG. 5 with a second variant for control of the frequency curve recording.
Figure 12:
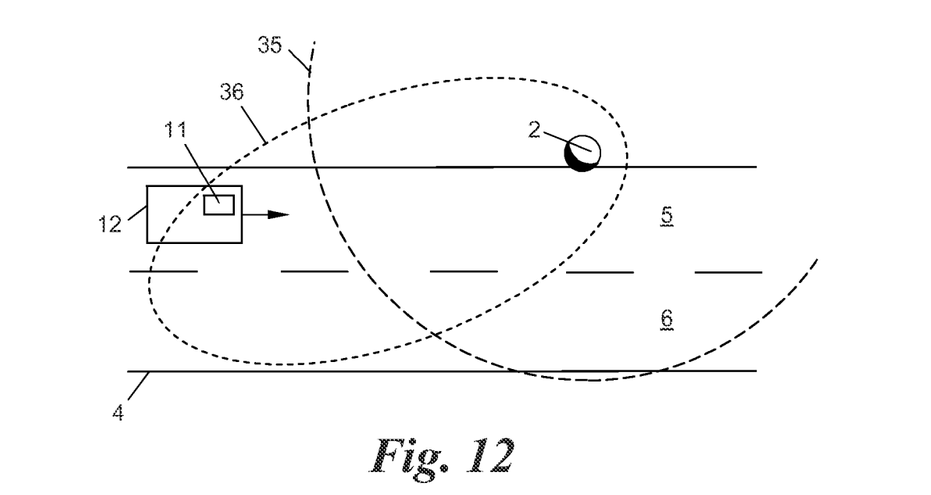
FIG. 12 shows a third variant of the invention for control of the frequency curve recording by way of a cutout section from FIG. 1.

As already explained, the frequency curves 13, 14 may only be recorded in a limited time range around the passage of beacon 2 and onboard unit 11. FIGS. 10 to 12 show some embodiments of how the recording of the received signal 10 can be conducted in the memory 21.

The embodiments of FIG. 10 can be performed both in the radio beacon 2 and in the onboard unit 11 and is based on an evaluation of the received signal strength of the signal 10 that is received in the radio beacon 2 or OBU 11 from the respective other communication partner. For this purpose, a path including a threshold detector 28 with a subsequently connected timer (monostable circuit) 29 is connected to the receiver 8. The path controls a switch 31 for the recording of the frequency curve 13, 14 in the memory 21, with a control signal 30. If the strength of the received signal 10 exceeds the threshold of the threshold detector 28, the recording of the frequency curve 13, 14 begins (symbolically switch 31 "closed") and ends again (symbolically switch 31 "open"), when the signal strength falls below the threshold of the threshold detector 28. The monostable circuit 29 in the control path causes the control signal 30 for the switch 31 to be respectively emitted over a time period that is at least as tong as the maximum possible duration of the gaps 26 in an intermittent signal 10 according to FIG. 9. This ensures that gaps 26 between data packets $10_i$ of the signal 10 do not lead to termination of the recording. Instead, the recording in the memory 21 is ended, when no further data packet $10_i$ received for the duration of the holding time of the monostable circuit 29.

It is understood that the hardware components shown in FIG. 10 can also be configured by correspondingly programmed software components of the radio beacon 2 or OBU 11.

FIG. 11 shows other embodiments of the OBU 11. The OBU 11 here is additionally equipped with a satellite navigation receiver 32, which continuously outputs the position p of the OBU 11 in a world coordinate system. A data bank 33 in the OBU 11 contains a list of prestored locations o of all radio beacons 2 of the road toll system 1 as reference. A map matcher 34 continuously compares the positions p determined by the satellite navigation receiver 32 with the prestored locations "o". When the position "p" comes into the vicinity of a location "o", e.g., within a predetermined distance, a control signal 30 is generated for "closing" the switch 31 for recording the signal 10 in the memory 21, by the monostable circuit 29.

Here, the monostable circuit 29 acts as timer that starts the recording for the minimum time period. However, the monostable circuit 29 can be omitted if the map matcher 34 continuously emits the control signal 30 so long as the position p is in the vicinity of a location o.

The hardware components shown in FIG. 11, such as the data bank 33, map matcher 34, monostable circuit 29 and symbolic switch 31, can again be configured by corresponding software components of the OBU 11.

FIG. 12 shows other embodiments of the radio beacon 2. The radio beacon 2 is equipped with an additional sensor, which detects the approach of an OBU 11 to the radio coverage area 35 of the transceiver 8 of the radio beacon 2 to start the recording of the signal 10 in the memory 21 in good time, before (or if) the OBU 11 enters the radio coverage area 35. The detection range of this sensor is indicated at 36.

The two ranges 35 and 36 can be set up, for example, by means of corresponding antenna characteristics, if a radio transceiver is used for the sensor. For example, the radio beacon 2 can have two different transceivers, i.e. a WAVE transceiver 8 with omnidirectional characteristic in the range 35 for determining and recording the frequency curve 13, 14 in the memory 21, and a DSRC transceiver for radio interrogation of OBUs 11 in the range 36 in order to detect their approach in good time and cause recording to occur in the range 35. The reverse variant is also possible, that is, a WAVE transceiver with greater range 36, possibly also with omnidirectional characteristic, and a DSRC radio transceiver 8 with smaller range 35, possibly also with omnidirectional characteristic can be used. The WAVE transceiver then detects the approaches of the OBU 11 and the DSRC transceiver causes the recording of the frequency curve 13, 14 to occur.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for determining a distance between a radio beacon and an onboard unit passing the radio beacon in a road toll system, wherein at least one of the radio beacon and the onboard unit emits a signal with a known frequency curve over time, the method comprising:
 receiving the signal by the other of the radio beacon and the onboard unit during the passing and recording the curve of the frequency of the received signal over time, wherein the recording of the frequency curve is started when the strength of the received signal exceeds a minimum threshold and is ended when the strength of the received signal falls below the minimum threshold;
 detecting a change in the recorded frequency curve exceeding a first threshold value;
 determining two far regions in the recorded frequency curve lying before and after the detected change in time that show a frequency change below a second threshold value;
 scaling the recorded frequency curve in such a manner that the far regions assume predetermined values; and
 determining said distance from the scaled frequency curve.

2. The method according to claim 1, wherein said distance is determined from a gradient of the scaled frequency curve in an inflection point thereof.

3. The method according to claim 1, wherein said distance is determined from a frequency value of the scaled frequency curve lying between an inflection point of the scaled frequency curve and a far region.

4. The method according to claim 1, wherein said distance is determined from an integral of the scaled frequency curve over a section lying between an inflection point thereof and a far region.

5. The method according to claim 1, wherein the recording of the frequency curve is performed over a minimum time period.

6. The method according to claim 1, wherein the signal is emitted by the radio beacon and received by the onboard unit, wherein the recording, detecting, seeking, scaling and determining are performed by the onboard unit.

7. The method according to claim 6, wherein sensor comprises a satellite navigation receiver for determining the position of the onboard unit and a list of prestored locations of radio beacons, and wherein an approach to the radio beacon is detected when a specific position of the onboard unit comes into the vicinity of a stored location.

8. The method according to claim 1, wherein the signal is emitted by the onboard unit and received by the radio beacon, wherein the recording, detecting, seeking, scaling and determining are performed by the radio beacon.

9. The method according to claim 8, wherein the sensor is a transceiver for radio interrogation of the onboard unit, the transceiver having a range greater than a receiving range of the radio beacon for said signal.

10. The method according to claim 1, wherein the signal is emitted intermittently and the frequency curve is processed in a time-discrete manner for time points at which the signal is received.

11. The method according to claim 1, wherein a road lane of a multi-lane road in which the onboard unit is moving is determined from the distance.

12. The method according to claim 1, wherein the curve of the frequency of the received signal is normalised to the known frequency curve before detecting said change in the recorded frequency curve.

13. A radio beacon for a road toll system for determining a distance of a vehicle passing the radio beacon, wherein the vehicle is equipped with an onboard unit which emits a signal with a known frequency curve over time comprising:
   a receiver configured to receive the signal of said passing vehicle;
   a sensor for detecting an approach of said vehicle towards the radio beacon;
   a memory electrically coupled to the receiver and the sensor and configured to record the curve of the frequency of the received signal over time, when said sensor detects the approach of the vehicle;
   a detector electrically coupled to the memory and configured to detect a change in the recorded frequency curve exceeding a first threshold value;
   a first evaluation device electrically coupled to the detector and the memory and configured to determine two far regions in the recorded frequency curve lying before and after the detected change that show a frequency change below a second threshold value;
   a scaling device electrically coupled to the memory and the first evaluation device and configured to scale the recorded frequency curve in such a manner that the far regions assume predetermined values; and
   a second evaluation device electrically coupled to the scaling device and configured to determine the distance from the scaled frequency curve.

14. The radio beacon according to claim 13, wherein the second evaluation device is further configured to determine said distance from a gradient of the scaled frequency curve in an inflection point thereof.

15. The radio beacon according to claim 13, wherein the second evaluation device is further configured to determine said distance from a frequency value of the scaled frequency curve lying between an inflection point of the scaled frequency curve and a far region.

16. The radio beacon according to claim 13, wherein the second evaluation device is further configured to determine said distance from an integral of the scaled frequency curve over a section lying between an inflection point thereof and the far regions.

17. The radio beacon according to claim 13, further comprising a transmitter for periodically emitting a request signal to prompt passing onboard units to respectively emit a response signal, wherein the radio beacon processes the frequency curve in a time-discrete manner for time points at which the request signal is received.

18. The radio beacon according to claim 13, wherein the sensor comprises a transceiver having a range greater than a range of the receiver for receiving said signal.

19. The radio beacon according to claim 13, wherein the memory is configured to record the curve of the frequency of the received signal over time normalised to the known curve.

20. An onboard unit for a road toll system for determining a distance from a radio beacon of the road toll system, wherein the radio beacon emits a signal with a known frequency curve over time comprising:
   a receiver configured to receive the signal from the radio beacon;
   a sensor for detecting an approach of the onboard unit towards said radio beacon;
   a memory electrically coupled to the receiver and the sensor and configured to record the frequency curve of the received signal over time, when said sensor detects said approach;
   a detector electrically coupled to the memory and configured to detect a change in the recorded frequency curve exceeding a first threshold value;
   a first evaluation device electrically coupled to the detector and the memory and configured to determine two far regions in the recorded frequency curve lying before and after the detected change in time that show a frequency change below a threshold value;
   a scaling device electrically coupled the memory and the first evaluation device and configured to scale the recorded frequency curve in such a manner that the far regions assume predetermined values; and
   a second evaluation device electrically coupled to the scaling device and configured to determine the distance from the scaled frequency curve.

21. The onboard unit according to claim 20, wherein the second evaluation device is further configured to determine said distance from a gradient of the scaled frequency curve in an inflection point thereof.

22. The onboard unit according to claim 20, wherein the second evaluation device is further configured to determine said distance from a frequency value of the scaled frequency curve lying between an inflection point of the scaled frequency curve and the far regions.

23. The onboard unit according to claim 20, wherein the second evaluation device is further configured to determine said distance from an integral of the scaled frequency curve over a section lying between an inflection point thereof and the far regions.

24. The onboard unit according to claim 20, wherein the sensor comprises a satellite navigation receiver for determining the position of the onboard unit and a list of prestored locations of radio beacons and is configured to detect the approach to the radio beacon when a specific position of the onboard unit comes into the vicinity of a stored location.

25. The onboard unit according to claim 20, wherein the memory is configured to record the curve of the frequency of the received signal over time normalised to the known curve.

26. A method for determining a distance between a radio beacon and an onboard unit passing the radio beacon in a road toll system, wherein at least one of the radio beacon and the onboard unit emits a signal with a known frequency curve over time, the method comprising:
   receiving the signal by the other of the radio beacon and the onboard unit during the passing and recording the curve of the frequency of the received signal over time, wherein the recording of the frequency curve is started when an approach of the onboard unit to a radio beacon is detected by a sensor of the onboard unit;
   detecting a change in the recorded frequency curve exceeding a first threshold value;
   determining two far regions in the recorded frequency curve lying before and after the detected change in time that show a frequency change below a second threshold value;
   scaling the recorded frequency curve in such a manner that the far regions assume predetermined values; and
   determining said distance from the scaled frequency curve.

27. The method according to claim 26, wherein the curve of the frequency of the received signal is normalised to the known frequency curve before detecting said change in the recorded frequency curve.

28. The method according to claim 26, wherein said distance is determined from a gradient of the scaled frequency curve in an inflection point thereof.

29. The method according to claim 26, wherein said distance is determined from a frequency value of the scaled frequency curve lying between an inflection point of the scaled frequency curve and a far region.

30. The method according to claim 29, wherein sensor comprises a satellite navigation receiver for determining the position of the onboard unit and a list of prestored locations of radio beacons, and wherein an approach to the radio beacon is detected when a specific position of the onboard unit comes into the vicinity of a stored location.

31. The method according to claim 26, wherein said distance is determined from an integral of the scaled frequency curve over a section lying between an inflection point thereof and a far region.

32. The method according to claim 26, wherein the recording of the frequency curve is performed over a minimum time period.

33. The method according to claim 26, wherein the signal is emitted by the radio beacon and received by the onboard unit, wherein the recording, detecting, seeking, scaling and determining are performed by the onboard unit.

34. The method according to claim 26, wherein the signal is emitted intermittently and the frequency curve is processed in a time-discrete manner for time points at which the signal is received.

35. The method according to claim 26, wherein a road lane of a multi-lane road in which the onboard unit is moving is determined from the distance.

36. A method for determining a distance between a radio beacon and an onboard unit passing the radio beacon in a road toll system, wherein at least one of the radio beacon and the onboard unit emits a signal with a known frequency curve over time, the method comprising:
receiving the signal by the other of the radio beacon and the onboard unit during the passing and recording the curve of the frequency of the received signal over time, wherein the recording of the frequency curve is started when an approach of an onboard unit to the radio beacon is detected by a sensor of the radio beacon;
detecting a change in the recorded frequency curve exceeding a first threshold value;
determining two far regions in the recorded frequency curve lying before and after the detected change in time that show a frequency change below a second threshold value;
scaling the recorded frequency curve in such a manner that the far regions assume predetermined values; and
determining said distance from the scaled frequency curve.

37. The method according to claim 36, wherein the curve of the frequency of the received signal is normalised to the known frequency curve before detecting said change in the recorded frequency curve.

38. The method according to claim 36, wherein said distance is determined from a gradient of the scaled frequency curve in an inflection point thereof.

39. The method according to claim 36, wherein said distance is determined from a frequency value of the scaled frequency curve lying between an inflection point of the scaled frequency curve and a far region.

40. The method according to claim 36, wherein said distance is determined from an integral of the scaled frequency curve over a section lying between an inflection point thereof and a far region.

41. The method according to claim 36, wherein the recording of the frequency curve is performed over a minimum time period.

42. The method according to claim 36, wherein the signal is emitted by the onboard unit and received by the radio beacon, wherein the recording, detecting, seeking, scaling and determining are performed by the radio beacon.

43. The method according to claim 42, wherein the sensor is a transceiver for radio interrogation of the onboard unit, the transceiver having a range greater than a receiving range of the radio beacon for said signal.

44. The method according to claim 36, wherein the signal is emitted intermittently and the frequency curve is processed in a time-discrete manner for time points at which the signal is received.

45. The method according to claim 36, wherein a road lane of a multi-lane road in which the onboard unit is moving is determined from the distance.

* * * * *